United States Patent Office 2,975,129
Patented Mar. 14, 1961

2,975,129

STABILIZED PETROLEUM OIL, GREASE AND WAX COMPOSITIONS CONTAINING DIBASIC LEAD PHOSPHITE

Jolly J. Taylor, 3342 Chapman St., Los Angeles, Calif.

No Drawing. Filed Feb. 20, 1957, Ser. No. 641,258

5 Claims. (Cl. 252—25)

This invention relates to the use of dibasic lead phosphite as an additive to petroleum oils, greases, waxes and other oleaginous products.

This application is a continuation-in-part of my applications Serial 314,560, filed October 13, 1952, and Serial No. 345,737, filed March 30, 1953, now Patent Nos. 2,783,159 and 2,783,160.

I have found that dibasic lead phosphite has a strong inhibiting effect to stabilize oil. In the above applications, I have described the use of this compound as a stabilizer for oil base paint formulated with drying or semi-drying oils, which paint may contain oil or fatty acid, modified alkyd resins, particularly the drying and semi-drying alkyd resins, or both oil and alkyd. The alkyds may be formulated by reacting drying oils or semi-drying oils or the equivalent fatty acid with glyceryl phthalate, maleate or sebacate in a manner well known for formulating these alkyds. Thus paints formulated with drying oils such as linseed oil, both virgin and treated, dehydrated castor oil, hempseed, sunflower, China wood, and tung oil, or with alkyds formed therefrom or from their equivalent acids or both, may be stabilized by the dibasic lead phosphite.

Pigments such as zinc oxide and zinc carbonate or lead carbonate or mixed lead and zinc base paints composed of a mixture of zinc oxide and lead carbonate are termed "reactive pigments," since paints which contain them in quantities sufficient to act as pigments will chalk when exposed to light.

I have found that I may produce superior paints and film formers in my invention by employing, in contradistinction to the above reactive pigments, the inert or non-reactive pigments which will not react with the oil or reaction products of the oil when exposed to sunlight and air. Such non-reactive pigments include titanium oxide and talc. Other siliceous pigments, such as aluminum silicate and mica, may be used. I may use antimony oxide, calcium carbonate, barium sulfate, zinc sulfate or lithopone. All of these pigments are classed as non-reactive pigments and are so classed by the oil trade.

I have observed that when paints formulated with these non-reactive pigments are exposed to sunlight and air in areas of intense sunlight, they, as well as the paints formulated with the reactive pigments, soon crack, chalk, and scale and the paint film breaks down.

I have found that small amounts of dibasic lead phosphite, when added to a paint formulated with non-reactive pigments, will stabilize the paint against scaling. The film produced from such stabilized paint will last much longer and scale less than a paint formulated with an inert filler from which the stabilizer is omitted. Comparing lead carbonate paints, in which the filler is entirely lead carbonate and carried in a linseed oil base containing a drying accelerator and mineral spirits in a conventional formulation, exemplified in Patent No. 2,483,469, with paint carrying the non-reactive filler and the stabilizer dibasic lead phosphite formulated according to the invention described herein, the lead carbonate paint will scale much more under exposure to sunlight and air for like periods than the stabilized paint referred to above.

The amount of dibasic lead phosphite required to give this stabilization is but a small percentage of paint pigment or filler, for example, below about .5 to 7.5% of the paint formulated with lead carbonate. The gloss retention of such paints is unsatisfactory in climates of intense sunlight and high summer temperature.

While I do not wish to be bound by any theory of the action of the dibasic lead phosphite, I believe that the dibasic lead phosphite inhibits the oxidative decomposition of the oil or of the oil or fatty acid modified alkyd.

I have found that the stabilization properties of dibasic lead phosphite are applicable to the hydrocarbon oils such as petroleum oils and capable of stabilizing such oils. I am of the opinion that in the stabilization of these petroleum oils the dibasic lead phosphite acts as an inhibitor of the attack of oxygen on these hydrocarbons or hydrocarbon chains.

It is significant that the hydrocarbon oils contain saturated and unsaturated radicals, just as the drying and semi-drying oils and the semi-drying and drying alkyds all contain saturated and unsaturated alkyl radicals. Thus the saturated and unsaturated fatty acids, to wit, palmitic, stearic, ricinoleic, oleic, linoleic, linolenic, oleostearic, all contain long alkyl or alkene radicals and are carboxylic acid derivatives of the corresponding hydrocarbons. The glyceryl esters of these acids are constituents of the drying and semi-drying oils referred to above. The above mentioned alkyds are also derivatives containing these alkyl and alkene radicals. These hydrocarbon oils, esters, alkyds and also waxes such as carnauba wax, are all included in the term "oleaginous" vehicles as hereafter employed.

These oleaginous vehicles of petroleum origin or glyceryl esters of the saturated or unsaturated fatty acid containing compounds which have alkyl, alkene or naphthenic groups or comprising the saturated or unsaturated alkyl radicals, or waxes may be stabilized against oxidative attack by the addition of about 0.2 to 25% by weight or less of dibasic lead phosphite dispersed in the oil or wax, based on the oil or wax. The bibasic lead phosphite is sold by the National Lead Company as "Dyphos" and has the asserted formula $$2PbOPbHPO_3 \cdot \tfrac{1}{2} H_2O$$

It is desirable, however, when using the said stabilizer in paints or other coatings to limit the percentage of the stabilizer so that it forms a minor constituent of the paint or coating and is not depended upon to be the main pigment constituent. Excessive concentration of the Dyphos materials will cause poor gloss retention and high degree of cracking. By reducing the concentration of the dibasic lead phosphite and employing, preferably, non-reactive pigment to supply the major portion of the pigment and filler required for the paint, a stabilized paint with improved resistance to cracking and gloss retention is obtained over that which may be obtained without the use of the dibasic lead phosphite or where excessive amounts thereof are employed, as where it is relied upon as the major or total constituent of the pigment. It is thus desirable to limit the concentration of the dibasic lead phosphite to less than about 7.5% of the paint or coating foundation. Since the optimum concentration will depend upon the nature of the oleaginous vehicle, it will be necessary to adjust the concentration to give the most desirable result. Those skilled in this art will be readily able to ascertain this value from the description herein given.

The following Examples 1 to 3 illustrate the action of dibasic lead phosphite as anti-oxidant in petroleum oil and as a stabilizer for greases formulated from such oil. These oils may be either acid refined or solvent refined oils of naphthenic or paraffinic crude oils. The solvent refined oils are made by extracting lubricating oil fractions with solvents such as phenol or furfural. In so doing the solvent removes the highly unsaturated and aromatic fractions as an extract, leaving a raffinate, which is composed mainly of the naphthenic, aliphatic, and perhaps those fractions containing aromatic rings which contain so many naphthenic and alkyl or alkene radicals as to make them partake nonaromatic character, as characterized by their relative insolubility in these solvents.

As is well known to those skilled in this art, such oils are now generally used as lubricating oils and for incorporation into lubricating greases. Greases, as is well known to those skilled in this art, are composed of an oil, usually petroleum oil, in which is dissolved or colloidally dispersed a soap or mixture of soap or other gel-forming additives which impart gel-like characteristics. To such greases may be added additives such as higher alcohols, esters, organic amines, polybutenes, sulfurized fatty materials, sulfur-chlorine compounds, fillers, such as graphite, talc, asbestos, mica, alumina, powdered zinc, zinc oxide, red lead, carbon black, and magnesium oxide.

Such soaps may be alkaline soaps, for example, sodium, potassium or lithium soaps, or alkaline earth soaps, for example, magnesium, calcium, barium or barium soap complex with barium acetate, or strontium soaps, lead soaps, zinc soaps, aluminum soaps, all being soaps or salts of organic acids usually saturated or unsaturated soap-forming fatty acids, such as stearic, palmitic, lauric, myristic, or of the unsaturated acids referred to above in connection with the alkyds. Other gelling agents may be used as, for example, the organophilic clays produced by exchanging clays having a suitable base exchange capacity with an onium compound; for example, greases formed according to U.S. Patent No. 2,531,440, employing the organophilic clay referred to in said patent or in U.S. Patent No. 2,431,427.

I have found that greases on exposure to light, and particularly if also exposed to elevated temperatures and high humidity, have their gel-like grease structures impaired and their utility as greases seriously impaired. While I do not wish to be bound by any theory of this action, I believe that the action is the result of the oxidative attack on the oil constituent of the grease. I have found that if I add from about .2 to about 25% by weight of dibasic lead phosphite based on the oleaginous vehicle in the grease, the grease is stabilized and will not break down as will like greases which do not contain this material.

Excessive quantities of the solid dibasic lead phosphite may give excessive quantities of solid matter in the grease. It is preferable to use the dibasic lead phosphite in fine particle size for incorporation into the grease, for example, particles of an average size of less than about five micron are useful for this purpose. The amount of stabilizer desirable will depend upon the nature of the oleaginous vehicle, i.e., its inherent oxidative resistance. As is well known, petroleum oils vary in their resistance to oxidation. It will be desirable to employ as little of the stabilizer as is required for the desired stabilization in order to reduce the solid content of the grease to as small proportion as is consistent with attaining the desired degree of stabilization. Those skilled in the art will be able to properly proportion my stabilizer from the description given herein. The following examples illustrate this phenomenon:

Example 1

A standard commercial sodium base grease, i.e., a grease made with a sodium salt of a soap-forming acid by saponification of tallow, was spread on part of a 10×4½″ black iron panel. On the adjoining part of the panel was spread grease formed by mixing S.A.E. #30 oil with Bentone 34 in amount equal to 9% of the oil and Dyphos in amount equal to 10% of the oil. Bentone 34, referred to in this example and in Example 3, is understood to be dimethyl octadecyl cetyl ammonia bentonite. Such a clay corresponds to the organophilic clays referred to in Patents 2,531,440 and 2,431,427. Such a material is sold under the trade name "Bentone 34" by National Lead Company. A strip of metal was left uncovered on the panel to separate the two greases. The panel was left in a high humidity cabinet for a month at room temperature of 50–85° F. On inspection it was observed that the sodium base grease without the dibasic lead phosphite had been almost completely removed from the panel as if it were washed off, while the grease containing the dibasic lead phosphite was unaffected. The panel was replaced in the cabinet and the exposure continued under the same conditions. The small remaining part of the sodium base grease film was oxidized to almost non-tacky form within three to four months; however, the grease containing the dibasic lead phosphite, after ten months' exposure, showed no apparent change in properties on visual inspection. The grease had its original consistency and appeared unoxidized. No grease was lost from the panel in contradistinction to the adjacent grease which did not contain the dibasic lead phosphite.

Example 2

The test described in Example 1 was also performed using in place of the sodium base grease, a calcium base grease. The metal under calcium base grease without the dibasic lead phosphite was badly blistered and rusted and mildewed, while the metal under the calcium base grease to which 10% of dibasic lead phosphite was added was untouched and the grease stabilized by the dibasic lead phosphite was unaffected.

Example 3

A grease was made by intimately mixing in a mill the following:

15 pounds of S.A.E. #30 oil
.9 pounds of Bentone, identified above
1.5 pounds of dibasic lead phosphite Another grease was made up in the same manner using 7½ pounds S.A.E. #30 oil, 1 pound of the dibasic lead phosphite and 0.45 pound of the Bentone.

Both greases when tested on a "Weeks" machine, a machine generally accepted in the oil industry as a measure of the extreme pressure lubricating value of oils and greases, were good up to 3400 p.s.i. according to this test.

The grease formed with 5 pounds of the above S.A.E. #30 lubricating oil, 0.4 pound of Bentone and 0.5 pound of dibasic lead phosphite was heated to about 160° F. and intimately mixed and homogenized. Test panels were covered in part by this grease and adjacent thereto the panel was covered with a commercial calcium soap cup grease. The panels were exposed to a high humidity, high temperature test chamber. After 4 months' exposure, the cup grease was oxidized to a dry film while the grease formulated with the dibasic lead phosphite remained soft and with the original consistency by visual inspection.

The dibasic lead phosphite is also effective as an antioxidant or stabilizer for wax formulations, including, for example, carnauba wax, spermaceti or ozokerite, and the like, or mixtures of waxes, e.g., of the aforementioned or other types. In this respect dibasic lead phosphite is of particular value when incorporated in wax formulations of the type applied as a protective coating over the paint finish on automobiles to prevent oxidation of the paint surface. Such formulations may also contain coloring pigment or dye if desired. Tests have shown that automotive wax formulations of this general type stand up much longer when dibasic lead phosphite is incorporated therein as compared to the same formulation not containing dibasic lead phosphite, as pointed out in Example 4 below.

*Example 4*

Dibasic lead phosphite was added to a conventional automotive wax formulation having the following composition:

| | Lbs. |
|---|---|
| Carnauba wax | 27 |
| Spermaceti | 50.5 |
| Ozokerite | 44 |
| Kerosene or naphtha | 32 |
| Diatomaceous silica (finest) | 65 |
| Cream tripoli | 131 |
| Bentonite | 16 |
| Water | 26.5 |
| Borax | 3¼ |
| Trisodium phosphate | 3¼ |
| Laundry soap chips (finest) | 16¼ |

The term "naphtha" is commonly known in the trade as varnish maker's and petroleum naphtha, and consists essentially of a petroleum fraction of substantially aliphatic hydrocarbons with a boiling range of about 150 to about 250° F.

The dibasic lead phosphite was employed in an amount of 6% based on the solids content of the above formulation, and was milled into the formulation to assure complete homogeneity.

The wax formulation containing dibasic lead phosphite was applied to one-half of an automobile, the car being divided in half from the radiator back over the middle of the top and down to the middle of the trunk for this purpose. The other half of the car was coated with the same above noted wax formulation, except that the dibasic lead phosphite was omitted.

At the end of six months, the wax coating on that side of the car to which the wax formulation not containing dibasic lead phosphite was applied, was practically entirely removed with oxidation of the paint apparent, whereas the side of the car coated with the wax formulation containing dibasic lead phosphite still substantially retained the wax coating, the paint thereunder having a better unoxidized appearance.

*Example 5*

A test similar to that of Example 4 was run over a two-year period, during which period the car was constantly exposed to the elements and was washed all over some 90 times.

In from 6 to 8 months the wax coating substantially disappeared on that side of the car coated with the composition not containing dibasic lead phosphite, while the other portion of the car coated with the formulation including dibasic lead phosphite still retained a wax coating at the end of the two-year period.

While I have described particular embodiments of my invention for the purpose of illustration, it should be understood that various modifications and adaptations thereof may be made within the spirit of the invention as set forth in the appended claims.

I claim:

1. A composition of matter consisting essentially of a substance of the group consisting of a petroleum oil fraction and a wax, said compostion containing from 0.2 to 25% by weight of dibasic lead phosphite as stabilizer, based on said substance.

2. A petroleum lubricating oil composition consisting essentially of a petroleum lubricating oil and 0.2 to 25% by weight of dibasic lead phosphite based upon said oil, as a stabilizer.

3. A lubricating grease consisting essentially of a petroleum oil fraction, a gelling agent and from 0.2 to 25% by weight of dibasic lead phosphite based upon said fraction, as stabilizer.

4. A wax composition consisting essentially of a wax and 0.2 to 25% by weight of dibasic lead phosphite based on said wax, as a stabilizer.

5. An auto wax composition consisting essentially of carnauba wax and 0.2 to 25% by weight of the total wax content, of dibasic lead phosphite as a stabilizer.

References Cited in the file of this patent

UNITED STATES PATENTS

| 2,038,444 | Ragg | Apr. 21, 1936 |
| 2,428,123 | Morgan et al. | Sept. 30, 1947 |
| 2,483,469 | Kebrich | Oct. 4, 1949 |
| 2,535,604 | Schiermeier | Dec. 26, 1950 |
| 2,662,932 | Warner | Dec. 15, 1953 |
| 2,667,464 | Greenhalgh | Jan. 26, 1954 |
| 2,783,160 | Taylor | Feb. 26, 1957 |

OTHER REFERENCES

Chem. Abstracts, vol. 50, page 9269a (1956).